(12) United States Patent
Takeuchi (10) Patent No.: US 11,527,360 B2
(45) Date of Patent: Dec. 13, 2022

(54) STORAGE DEVICE AND METHOD (71) Applicant: Kioxia Corporation, Tokyo (JP)

(72) Inventor: Ryo Takeuchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 96 days.

(21) Appl. No.: 17/017,969

(22) Filed: Sep. 11, 2020

(65) Prior Publication Data

US 2021/0280369 A1 Sep. 9, 2021

(30) Foreign Application Priority Data

Mar. 6, 2020 (JP) .............................. JP2020-038805

(51) Int. Cl.
| | | |
|---|---|---|
| *G10K 11/16* | (2006.01) | |
| *H01G 4/12* | (2006.01) | |
| *H02M 1/32* | (2007.01) | |
| *G01H 1/04* | (2006.01) | |
| *H01G 4/35* | (2006.01) | |
| *H01G 4/232* | (2006.01) | |
| *H01G 4/38* | (2006.01) | |
| *H03G 3/00* | (2006.01) | |

(52) U.S. Cl.
CPC ................ *H01G 4/12* (2013.01); *G01H 1/04* (2013.01); *G10K 11/16* (2013.01); *H01G 4/232* (2013.01); *H01G 4/35* (2013.01); *H01G 4/38* (2013.01); *H02M 1/32* (2013.01)

(58) Field of Classification Search
CPC ............ H01G 4/12; H01G 4/232; H01G 4/35; H01G 4/38; G01H 1/04; G10K 11/16; H02M 1/32
USPC ....................................................... 381/71.1
See application file for complete search history.

(56) References Cited

U.S. PATENT DOCUMENTS

| | | | |
|---|---|---|---|
| 8,421,556 B2 | 4/2013 | Chen et al. | |
| 9,704,651 B2 | 7/2017 | Fujimura et al. | |
| 2009/0092262 A1* | 4/2009 | Costa .................. | G06F 1/20 |
| | | | 381/71.1 |
| 2019/0393360 A1* | 12/2019 | Pathak ............... | H01L 27/0676 |
| 2021/0194462 A1* | 6/2021 | Morii ...................... | H03H 7/38 |

FOREIGN PATENT DOCUMENTS

| | | |
|---|---|---|
| JP | 2004-153121 A | 5/2004 |
| JP | 2015-135910 A | 7/2015 |

* cited by examiner

*Primary Examiner* — Ammar T Hamid
(74) *Attorney, Agent, or Firm* — Oblon, McClelland, Maier & Neustadt, L.L.P.

(57) ABSTRACT

According to one embodiment, an electronic device includes a power-supply voltage input terminal, a first capacitor, and a second capacitor. The first capacitor has a fixed capacitance. The second capacitor has a variable capacitance. The first capacitor and the second capacitor are connected in parallel to the power-supply voltage input terminal.

20 Claims, 7 Drawing Sheets

STORAGE DEVICE AND METHOD

CROSS-REFERENCE TO RELATED APPLICATIONS

This application is based upon and claims the benefit of priority from Japanese Patent Application No. 2020-038805, filed Mar. 6, 2020, the entire contents of which are incorporated herein by reference.

FIELD

Embodiments described herein relate generally to a storage device and a method.

BACKGROUND

There is an electronic device in which a multilayer ceramic capacitor is connected to a power-supply voltage line to stabilize the power-supply voltage and filter noises. When the power-supply voltage fluctuates, the multilayer ceramic capacitor expands and contracts due to the electrostrictive effect. As a result, a board on which the multilayer ceramic capacitor is mounted vibrates in the surface direction.

The vibration of the board is inaudible to humans as sound even if the fluctuation frequency of the power-supply voltage is in the audible frequency band (about 20 Hz to 20 kHz) while the intensity of the vibration is small. However, when the fluctuation frequency of the power-supply voltage matches the frequency (hereinafter referred to as a natural frequency) which is inherent to a vibration of the board, the board resonates and the vibration intensity of the board increases. As a result, the vibration of the board is audible to humans as sound. This is called buzzing noise.

Buzzing noise is not a particular problem in systems where quietness is not required. However, in recent years, electronic devices that have been downsized are required to reduce buzzing noise in some cases.

DETAILED DESCRIPTION

Embodiments will be described hereinafter with reference to the accompanying drawings. The disclosure is merely an example and in no way restricts the invention to the following embodiment. Modifications which are easily conceivable by a person of ordinary skill in the art come within the scope of the invention as a matter of course. In some cases, to make the description clearer, the sizes, shapes and the like of the respective parts are illustrated schematically in the drawings, rather than as an accurate representation of what is implemented. In some cases, corresponding elements in the drawings are denoted by the same reference numbers and detailed description thereof is omitted unless necessary. In the following description, "connection" means not only direct connection but also indirect connection through other elements.

In general, according to one embodiment, a storage device includes a power-supply voltage input terminal, a first capacitor, and a second capacitor. The first capacitor has a fixed capacitance. The second capacitor has a variable capacitance. The first capacitor and the second capacitor are connected in parallel to the power-supply voltage input terminal.

Figure 1:
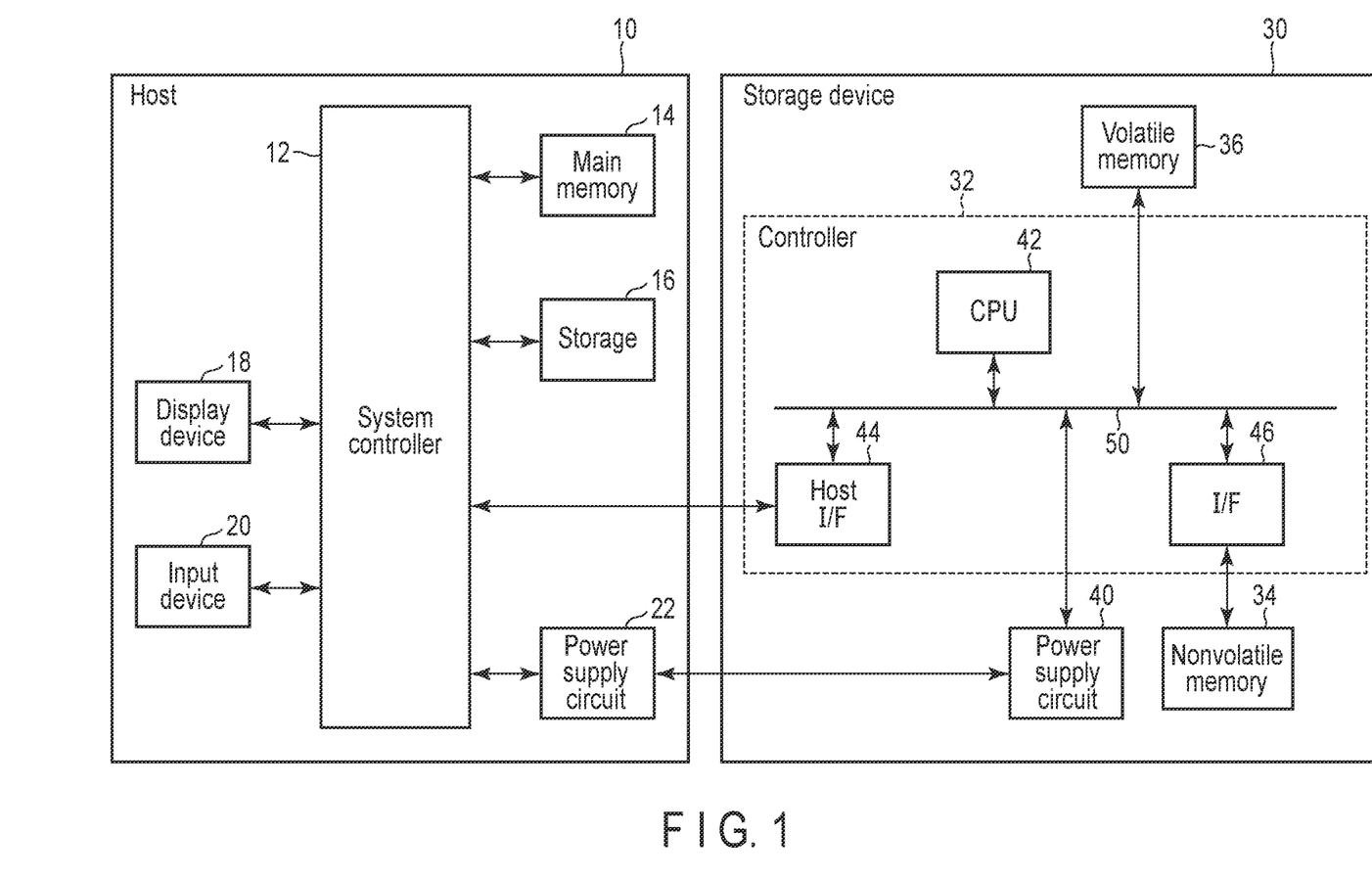
FIG. 1 is a block diagram illustrating an example of a configuration of an electronic device according to the first embodiment.

FIG. 1 is a block diagram illustrating an example of an electronic device according to an embodiment. Although the electronic device is not limited to a particular device, an example of the electronic device is a storage device 30 in this specification. The storage device 30 is connected to a host (may be called a host device) 10.

The host 10 is an information processing device that accesses the storage device 30. The host 10 writes data into the storage device 30 or reads data from the storage device 30. The host 10 may be a server that writes a plurality of various data into the storage device 30. Further, the host 10 may be a personal computer. The host 10 can be connected to a server of a manufacturer of the storage device 30 via a network, and a buzzing noise cancelling program can be downloaded from the server to the host 10 via the network.

An example of the storage device 30 is a solid state device (SSD) including a nonvolatile memory. The storage device 30 may be connected to the host 10 via a cable or a network.

The host 10 may include a system controller 12, a main memory 14, a storage 16, a display device 18, an input device 20, a power supply circuit 22, and the like.

The system controller 12 is connected to the main memory 14, the storage 16, the input device 20, and the power supply circuit 22, and controls these. The system controller 12 can be realized by a circuit such as a System on Chip (SoC). The SoC is configured by mounting a CPU and hardware logics that realize the functions required to control each unit in the host on a semiconductor chip.

The main memory 14 is a volatile storage device into which an OS and a control program stored in the storage 16 are loaded. An example of the control program is the buzzing noise cancelling program. The system controller 12 can execute the OS and the control program loaded in the main memory 14.

The storage 16 is a nonvolatile storage device that stores the operating system (OS) and the control program for the storage device 30.

The display device 18 displays a setting screen and the like when executing the buzzing noise cancelling program. The input device 20 is configured to input information to be set on the setting screen displayed on the display device 18 when the buzzing noise cancelling program is executed.

The input device 20 may be a keyboard. The screen of the display device 18 may be a screen capable of touch input, and the input device 20 may be integrated with the display device 18.

The power supply circuit 22 generates a power-supply voltage (DC voltage) from a commercial AC power-supply voltage and supplies the generated power-supply voltage to the storage device 30.

The storage device 30 may include a controller 32, a nonvolatile memory 34, a volatile memory 36, a power supply circuit 40, and the like. The controller 32, the nonvolatile memory 34, the volatile memory 36, and the power supply circuit 40 are mounted on one or more boards.

The controller 32 functions as a memory controller configured to control the nonvolatile memory 34. The controller 32 can be realized by a circuit such as an SoC. The controller 32 accesses the nonvolatile memory 34 according to a command transmitted from the host 10, and writes data into the nonvolatile memory 34 or reads data from the nonvolatile memory 34. The controller 32 controls the power supply circuit 40 according to a command from the host 10 and controls generation of one or more power-supply voltages supplied to each device of the storage device 30.

The nonvolatile memory 34 is, for example, a NAND type flash memory. However, the nonvolatile semiconductor memory is not limited to the NAND type flash memory. Other nonvolatile semiconductor memories such as NOR type flash memory may be used. Although not illustrated, the nonvolatile memory 34 may include a plurality of flash memory chips (that is, a plurality of flash memory dies). The nonvolatile memory 34 may be configured to be able to store one bit or a plurality of bits per memory cell. The controller 32 controls reading and writing of the nonvolatile memory 34. The nonvolatile memory 34 is connected to an I/F 46.

The volatile memory 36 is, for example, a Dynamic Random Access Memory (DRAM) of a double data rate 3 low voltage (DDR3L) standard. The volatile memory 36 may be provided not only outside the controller 32 but also inside the controller 32. In that case, a Static Random Access Memory (SRAM) may be used as the volatile memory 36. The SRAM is a volatile memory built in the controller 32 and capable of higher speed access.

The power supply circuit 40 generates one or more power-supply voltages (DC voltages) necessary for each device of the storage device 30 from the DC voltage output from the host 10. The power supply circuit 40 may be formed by an IC or several ICs. A control signal for controlling the power supply circuit 40 is transmitted from the controller 32 according to a predetermined communication standard. The communication standard between the power supply circuit 40 and the controller 32 may be, for example, a serial communication standard. An example of the serial communication standard is the I2C system.

The controller 32 may include a CPU 42, a host interface (host I/F) 44, the interface (I/F) 46, and the like. The CPU 42, the host I/F 44, and the I/F 46 are connected to a bus line 50.

The CPU 42 executes a firmware stored in the nonvolatile memory 34 and realizes various functions.

The host interface (host I/F) 44 connects the host 10 and the storage device 30, and functions as a circuit that receives various commands from the host 10, such as I/O commands and various control commands. Various standards can be used as the host I/F 44. For example, standards such as Small Computer System Interface (SCSI) (registered trademark), PCI Express (registered trademark) (also referred to as PCIe (registered trademark)), Serial Attached SCSI (SAS) (registered trademark), Serial Advanced Technology Attachment (SATA) (registered trademark), Non Volatile Memory Express (NVMe (registered trademark)), Universal Serial Bus (USB) (registered trademark), Universal Asynchronous Receiver/Transmitter (UART) (registered trademark), etc., can be used as the host I/F 44.

The I/F 46 functions as a control circuit configured to control the nonvolatile memory 34. Examples of the I/F 46 include Toggle DDR and Open NAND Flash Interface (ONFI).

Figure 2:
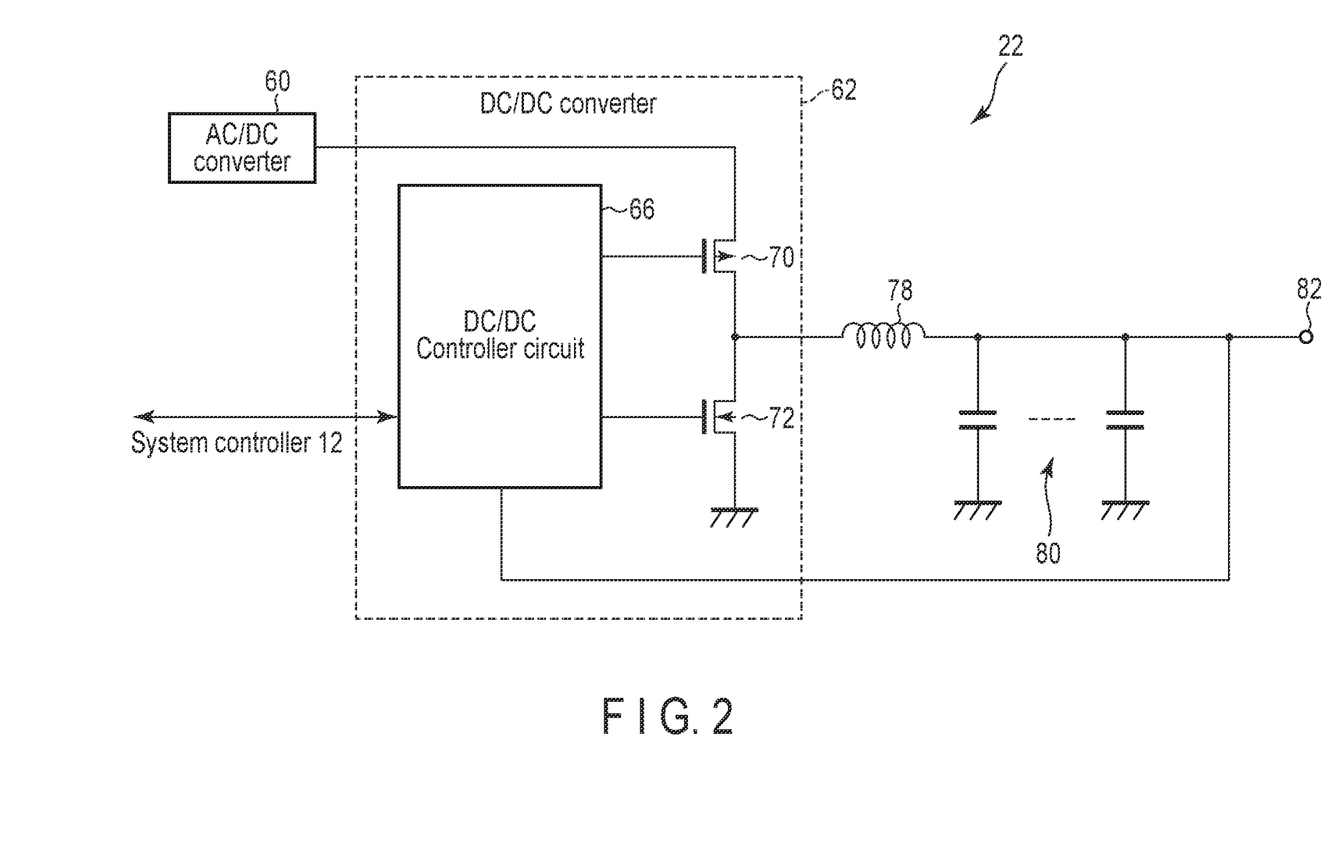
FIG. 2 is an example of a circuit diagram of a power supply circuit of a host according to the first embodiment.

FIG. 2 is an example of a circuit diagram of the power supply circuit 22. The power supply circuit 22 may include an AC/DC converter 60, a DC/DC converter 62, a choke coil 78, a plurality of capacitors 80, a power-supply voltage output terminal 82, and the like.

The AC/DC converter 60 converts a commercial AC power-supply voltage into one or more DC voltages.

The DC/DC converter 62 steps down the output DC voltage of the AC/DC converter 60 and outputs the DC voltage. Although not illustrated in FIG. 2, the DC/DC converter 62 may output a plurality of DC voltages. Examples of the DC voltages output by the DC/DC converter 62 may include DC5V, DC3.3V, and the like. The DC/DC converter 62 may include an output switch and a DC/DC controller circuit 66. The output switch may include a Pch MOS transistor 70 and an Nch MOS transistor 72, which are connected in series between an output terminal of the AC/DC converter 60 and a ground terminal. The MOS transistor 70 is connected to the output terminal of the AC/DC converter 60. The MOS transistor 72 is connected to the ground terminal. Gate terminals of the MOS transistors 70 and 72 are connected to the DC/DC controller circuit 66.

The DC/DC controller circuit 66 supplies control signals to the gate terminals of the MOS transistors 70 and 72 to make the MOS transistors 70 and 72 conductive or non-conductive. The DC/DC controller circuit 66 drives the Pch MOS transistor 70 and the Nch MOS transistor 72 at a constant switching frequency by a pulse width modulation (PWM) method or a variable switching frequency by a pulse frequency modulation (PFM) method. The PWM method is used when the power consumption of the storage device 30 is equal to or greater than a threshold value. The PFM method is used when the power consumption of the storage device 30 is less than the threshold value.

When the MOS transistors 70 and 72 are conductive, a current from the AC/DC converter 60 flows to the power-supply voltage output terminal 82 through the choke coil 78, and the choke coil 78 stores energy. When the MOS transistors 70 and 72 are non-conductive, the choke coil 78 releases energy and causes an induced current to flow in a direction in which current change can be prevented.

The plurality of capacitors 80 are connected to the power-supply voltage output terminal 82 to remove noise and smooth the output current.

The power-supply voltage output terminal 82 is connected to the DC/DC controller circuit 66 and monitors the load connected to the power supply circuit 22, that is, the power consumption of the storage device 30.

The connection point of the MOS transistors 70 and 72 is connected to the power-supply voltage output terminal 82 via the choke coil 78 in series. The plurality of capacitors 80 are connected in parallel to the power-supply voltage output terminal 82. The choke coil 78 and the plurality of capacitors 80 form an LC filter for removing noise from the DC voltage from the DC/DC converter 62 to be output from the power-supply voltage output terminal 82 and stabilizing the level of the DC voltage.

Figure 3:
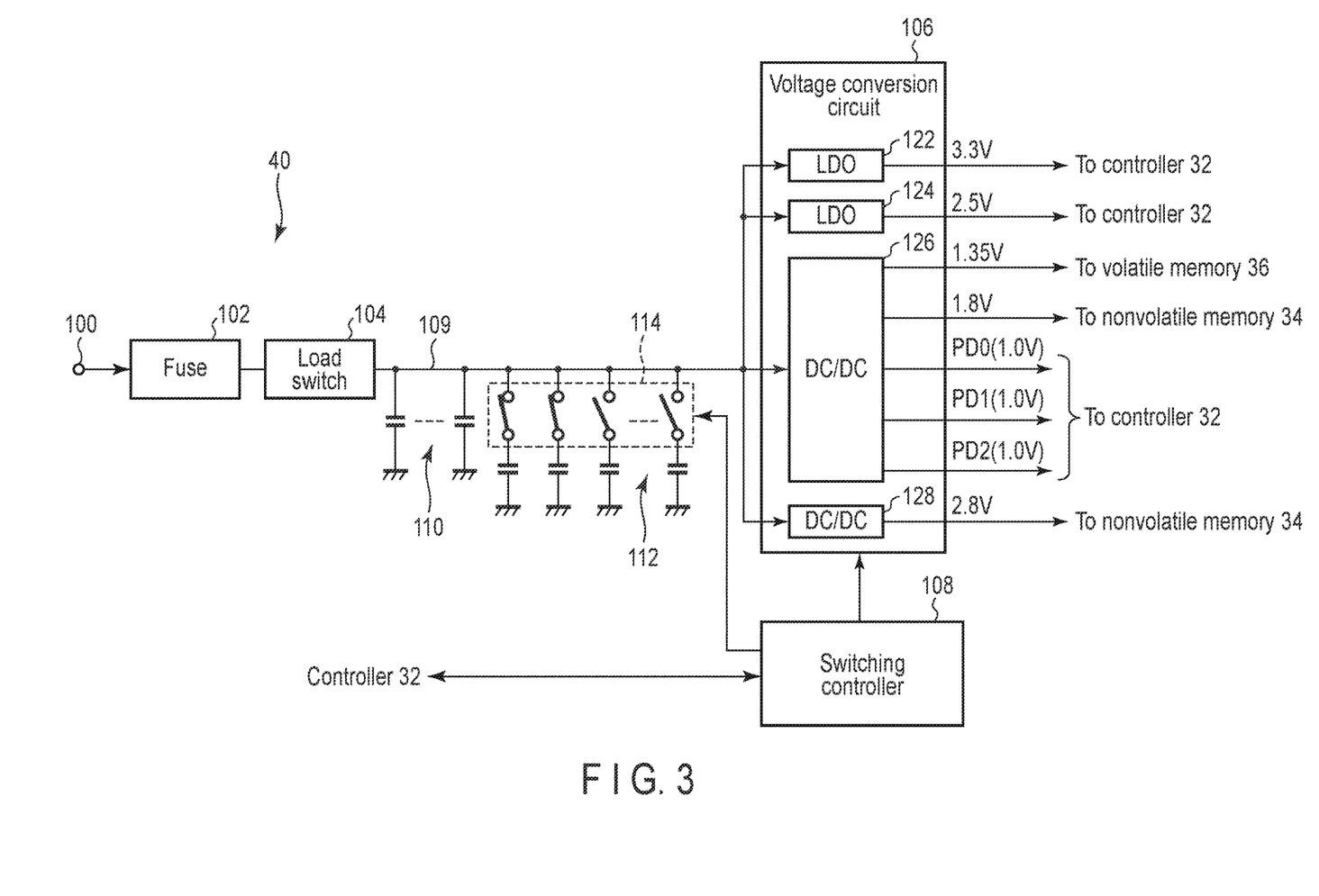
FIG. 3 is an example of a circuit diagram of a power supply circuit of the electronic device according to the first embodiment.

FIG. 3 is an example of a circuit diagram of the power supply circuit 40. The power supply circuit 40 may include a power-supply voltage input terminal 100, a fuse 102, a load switch 104, a voltage conversion circuit 106, a switching controller 108, a plurality of capacitors 110, a plurality of capacitors 112, a plurality of switches 114, and the like. The power-supply voltage input terminal 100 is connected to the power-supply voltage output terminal 82 of the power supply circuit 22.

The power-supply voltage input terminal 100 is connected to an input terminal of the voltage conversion circuit 106 via the fuse 102 and the load switch 104 in series.

The fuse 102 is blown when a current of a certain value or more flows. After the blowing, the current from the host 10 is not supplied to the load switch 104 unless the fuse 102 is replaced. The load switch 104 is normally conductive. The output voltage of the load switch 104 which is conductive is the same as the voltage of the power-supply voltage input terminal 100. When the input current is equal to or higher than a certain current, the load switch 104 is non-conductive. When the load switch 104 is non-conductive, the output voltage of the load switch 104 is 0V. The current at which the fuse 102 is blown may be higher or lower than or the same as the current at which the load switch 104 which is conductive becomes non-conductive. The fuse 102 and the load switch 104 doubly prevent an overcurrent from being supplied to the voltage conversion circuit 106.

The plurality of capacitors 110 and the plurality of capacitors 112 are connected in parallel to a power-supply voltage line 109 between the load switch 104 and the voltage conversion circuit 106 to stabilize the power-supply voltage and filter noise. The capacitors 110 are configured to stabilize the power-supply voltage line 109. The capacitors 112 are configured to cancel buzzing noise. Each of the capacitors 110 and 112 may be formed by a multilayer ceramic capacitor. An example of the capacitance of each of the capacitors 110 and 112 is several microfarads. Therefore, the size of one side of each of the capacitors 110 and 112 may be several millimeters. The plurality of capacitors 110 are directly connected to the power-supply voltage line 109. The plurality of capacitors 112 are connected to the power-supply voltage line 109 via the plurality of switches 114, respectively. Each of the plurality of switches 114 may be formed by a MOS transistor or the like. Each of the plurality of switches 114 is made conductive or non-conductive by a control signal from the switching controller 108. The synthesis capacitance of the plurality of parallel capacitors 112 changes according to the number of conductive switches among the plurality of switches 114. Therefore, the synthesis capacitance of the capacitors 110 and 112 connected to the power-supply voltage line 109 also changes according to the number of conductive switches among the plurality of switches 114.

The power-supply voltage line 109 is connected to the connection point of the MOS transistors 70 and 72 which is the output terminal of the DC/DC converter 62 via the load switch 104, the fuse 102, the power power-supply voltage input terminal 100, the power-supply voltage output terminal 82 of the host 10, and the choke coil 78. As a result, the synthesis capacitance of the capacitors 80, 110, and 112 connected to the output terminal of the DC/DC converter 62 also changes according to the number of conductive switches among the plurality of switches 114. When this synthesis capacitance changes, the switching frequency of the DC/DC converter 62 also changes.

The voltage conversion circuit 106 may include Low Dropouts (LDO) 122 and 124, DC/DC converters (referred to as DC/DC in FIGS. 3) 126 and 128, and the like. The LDOs 122 and 124 and the DC/DC converters 126 and 128 may be formed by individual ICs or may be formed by a single IC. The single IC may be referred to as a Power Management IC (PMIC).

The LDOs 122 and 124 and the DC/DC converters 126 and 128 respectively generate a plurality of power-supply voltages required by each device in the storage device 30 by stepping down the input voltage or using the input voltage as it is. Each of the LDOs 122 and 124 is a circuit that outputs the power-supply voltage of a device that requires a small current. Each of the DC/DC converters 126 and 128 is a circuit that outputs the power-supply voltage of a device that requires a large current. The switching controller 108 controls the LDOs 122 and 124 and the DC/DC converters 126 and 128 based on the control signal from the controller 32. The switching controller 108 switches the control method of the DC/DC converter 126 between the PWM method and the PFM method according to the load of the DC/DC converter 126.

It is assumed that the DC/DC converter 62 outputs DC 3.3V. The LDO 122 uses the input voltage, as it is to generate a 3.3V power-supply voltage. The 3.3V power-supply voltage may be supplied to the controller 32. The LDO 124 steps down the input voltage to generate a 2.5V power-supply voltage, for example. The 2.5V power-supply voltage may be supplied to the controller 32. The DC/DC converter 128 steps down the input voltage to generate a 2.8V power-supply voltage, for example. The 2.8V power-supply voltage may be supplied to the nonvolatile memory 34.

The DC/DC converter 126 steps down the input voltage to generate a 1.35V power-supply voltage, a 1.8V power-supply voltage, and three-channel 1.0V power-supply voltages PD0, PD1, and PD2, for example. The 1.35V power-supply voltage may be supplied to the volatile memory 36. The 1.8V power-supply voltage may be supplied to the nonvolatile memory 34. Three-channel 1.0V power-supply voltages PD0, PD1, and PD2 may be supplied to various parts of the controller 32.

The DC/DC converter 126 may not generate the power-supply voltage PD0, PD1, or PD2 depending on the power state of the storage device 30. For example, when the power state of the storage device 30 is a power saving mode, the DC/DC converter 126 does not generate the power-supply voltages PD2 and PD1, but generates the power-supply voltage PD0.

When the voltage of the power-supply voltage line 109 fluctuates, the capacitors 110 and 112 expand and contract due to the electrostrictive effect. As a result, the mounting board of the capacitors 110 and 112 vibrates in the surface direction. In the power supply circuit 22 of the host 10 that generates the voltage to be supplied to the power-supply voltage line 109, when the DC/DC converter 62 is driven by the PWM method and the frequency is outside the audible frequency band, no buzzing noise occurs even if the mounting board vibrates. However, when the DC/DC converter 62 is driven by the PWM method at a frequency in the audible frequency band, buzzing noise may occur. Further, when the DC/DC converter 62 is driven by the PFM method, the frequency may be in the audible frequency band, and thus buzzing noise may occur. However, even when the fluctuation frequency of the voltage of the power-supply voltage line 109 is in the audible frequency band, if the vibration intensity of the board is small, no buzzing noise occurs.

The mounting board of the storage device 30 has a natural vibration frequency determined according to its physical shape, size, arrangement of parts, and the like. The natural vibration frequency is the number of vibrations per unit time, and the unit is Hz. The natural vibration frequency is also called a natural frequency. The number of natural frequencies is not limited to singular and may be plural. Depending on the type of storage device 30, the natural frequency may be in the audible frequency band.

Figure 4:
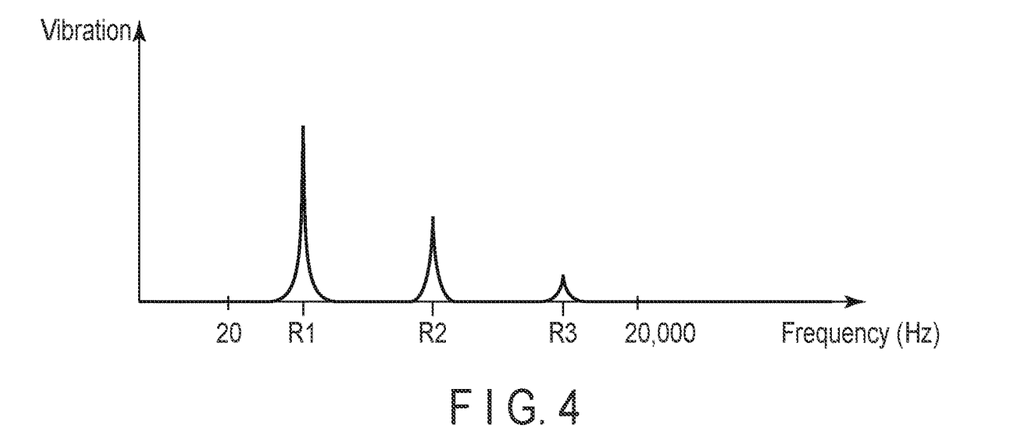
FIG. 4 is a diagram illustrating an example of natural frequencies of the electronic device according to the first embodiment.

FIG. 4 shows an example of frequency characteristics of vibration of the storage device 30. Since there are peaks of vibration at frequencies R1, R2, and R3, frequencies R1, R2, and R3 are natural frequencies.

Figure 5A:
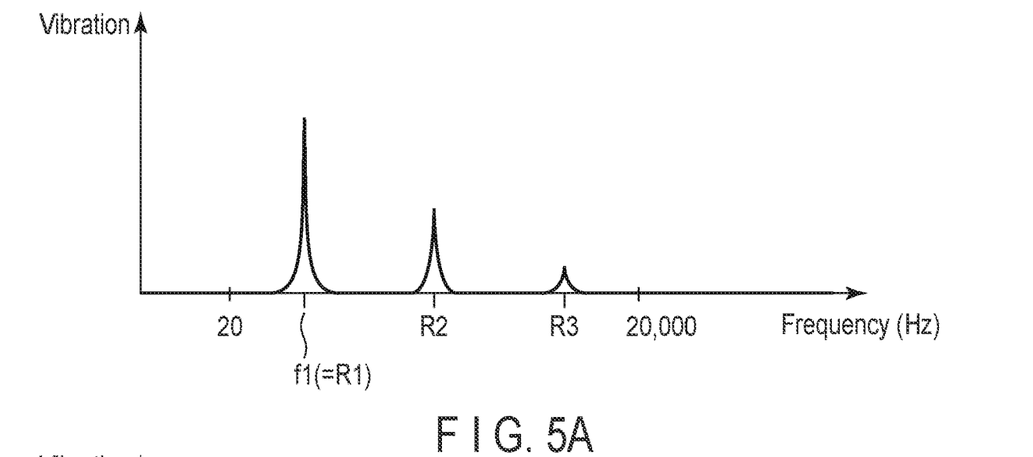
FIG. 5A is a diagram illustrating a fluctuation frequency of a power-supply voltage line when buzzing noise occurs according to the first embodiment.

FIG. 5A is a diagram illustrating a fluctuation frequency of the voltage of the power-supply voltage line when buzzing noise occurs according to the first embodiment. As illustrated in FIG. 5A, when the natural frequencies R1, R2, and R3 are in the audible frequency band of 20 Hz to 20 kHz, and the fluctuation frequency f1 of the voltage of the power-supply voltage line matches any of the natural frequencies R1, R2, and R3, the mounting board resonates, and the intensity of vibration of the mounting board increases, so that buzzing noise occurs. FIG. 5A shows an example in which the fluctuation frequency f1 matches the natural frequency R1. Resonance phenomenon occurs even when the fluctuation frequency f1 matches the natural frequency R2 or R3.

Figure 5B:
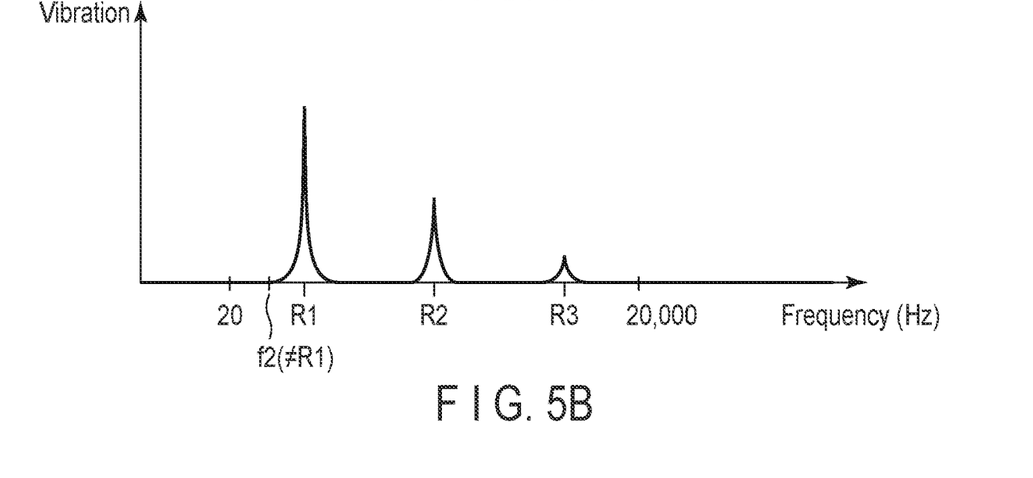
FIG. 5B is a diagram illustrating a fluctuation frequency of the power-supply voltage line when buzzing noise does not occur according to the first embodiment.

FIG. 5B is a diagram illustrating a fluctuation frequency of the voltage of the power-supply voltage line when buzzing noise does not occur according to the first embodiment. Even when the natural frequencies R1, R2, and R3 are in the audible frequency band of 20 Hz to 20 kHz as illustrated in FIG. 5B, if the fluctuation frequency f2 of the voltage of the power-supply voltage line does not match any of the natural frequencies R1, R2, and R3, no resonance occurs and no buzzing noise occurs. The voltage of the power-supply voltage line 109 is an output voltage of the DC/DC converter 62 of the power supply circuit 22 of the host 10.

In the embodiment, the fluctuating frequency of the output voltage of the DC/DC converter 62 is adjusted to prevent the occurrence of buzzing noise. Since the capacitors 112 are connected to the power-supply voltage line 109 via the switches 114 in the power supply circuit 40 of the storage device 30, the synthesis capacitance of the capacitors 80, 110, and 112 connected to the output terminal of the DC/DC converter 62 also changes according to the number of conductive switches among the plurality of switches 114. When this synthesis capacitance changes, the switching frequency of the DC/DC converter 62 changes.

Figure 6A:
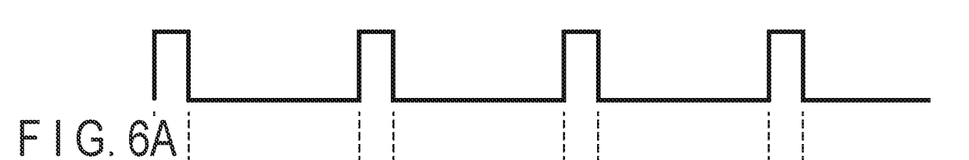
FIG. 6A is a diagram illustrating a control signal waveform of a MOS transistor of the power supply circuit of the host according to the first embodiment.
Figure 6B:
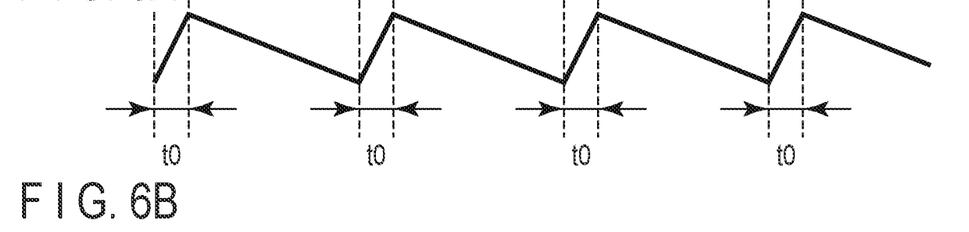
FIG. 6B is a diagram illustrating a voltage waveform of an output terminal of the power supply circuit of the host according to the first embodiment.

FIGS. 6A to 6F show examples of operation waveforms when the DC/DC converter 62 of the power supply circuit 22 of the host 10 is driven by the PFM method. FIG. 6A shows a waveform of the control signal supplied from the DC/DC controller circuit 66 to the gate terminal of the MOS transistor 70. FIG. 6B shows a voltage waveform of the power-supply voltage output terminal 82 of the power supply circuit 22. In the PFM method, the DC/DC controller circuit 66 makes the MOS transistor 70 conductive for a certain period t0 when the voltage of the power-supply voltage output terminal 82 of the power supply circuit 22 becomes a threshold value or less. When the MOS transistor 70 is conductive, a current flows from the DC/DC converter 62 to the choke coil 78, and the capacitors 80 are charged. Therefore, the voltage of the power-supply voltage output terminal 82 of the power supply circuit 22 rises.

After the certain period t0, the DC/DC controller circuit 66 makes the MOS transistor 70 non-conductive. Therefore, the voltage of the power-supply voltage output terminal 82 of the power supply circuit 22 falls. When the voltage of the power-supply voltage output terminal 82 of the power supply circuit 22 becomes the threshold value or less, the above operation is repeated.

As described above, the switching frequency of the PFM method is determined according to the frequency at which the voltage of the power-supply voltage output terminal 82 of the power supply circuit 22 becomes the threshold value or less. The frequency at which the voltage of the power-supply voltage output terminal 82 becomes the threshold value or less is determined according to the synthesis capacitance of the capacitors 80, 110, and 112 connected to the power-supply voltage output terminal 82, i.e., the power-supply voltage line 109. Therefore, the switching frequency of the PFM method can be changed by changing the number of conductive switches among the plurality of switches 114 that respectively connect the plurality of capacitors 112 to the power-supply voltage line 109 in the power supply circuit 40 of the storage device 30. FIGS. 6A and 6B assume that half of the switches 114 are conductive.

Figure 6C:
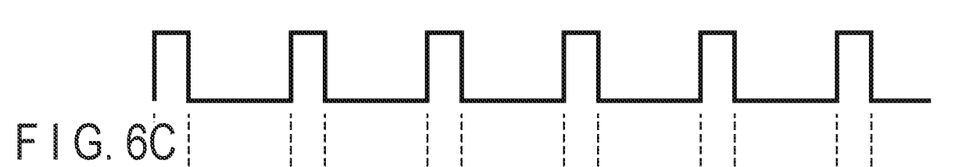
FIG. 6C is a diagram illustrating a control signal waveform of the MOS transistor of the power supply circuit of the host according to the first embodiment when the number of conductive switches is reduced as compared to the cases of FIGS. 6A and 6B.
Figure 6D:
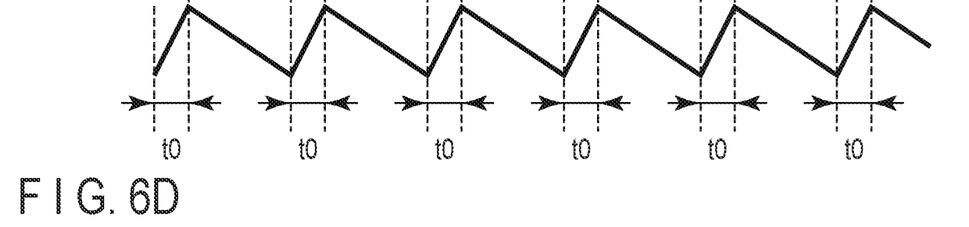
FIG. 6D is a diagram illustrating a voltage waveform of the output terminal of the power supply circuit of the host according to the first embodiment when the number of conductive switches is reduced as compared to the case of FIGS. 6A and 6B.

FIG. 6C shows an example of a waveform of the control signal supplied from the DC/DC controller circuit 66 to the gate terminal of the MOS transistor 70 and FIG. 6D shows an example of a voltage waveform of the power-supply voltage output terminal 82 of the power supply circuit 22, when the number of conductive switches 114 is decreased as compared to the case of FIGS. 6A and 6B. As the synthesis capacitance of the capacitors 80, 110, and 120 connected to the power-supply voltage output terminal 82 increases, the time for which the voltage of the power-supply voltage output terminal 82 is the threshold value or less becomes shorter. Thus, in the case of FIGS. 6C and 6D, the switching frequency of the PFM method is higher than that in the case of FIGS. 6A and 6B.

Figure 6E:
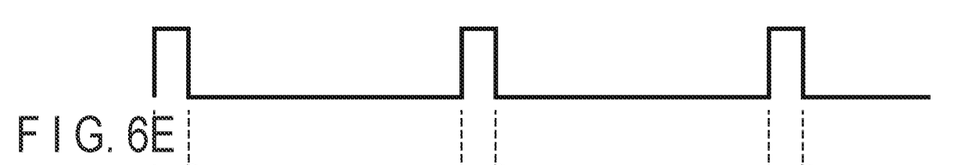
FIG. 6E is a diagram illustrating a control signal waveform of the MOS transistor of the power supply circuit of the host according to the first embodiment when the number of conductive switches is increased as compared to the cases of FIGS. 6A and 6B.
Figure 6F:
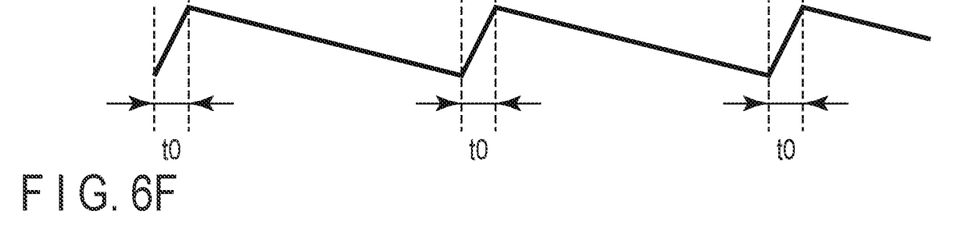
FIG. 6F is a diagram illustrating a voltage waveform of the output terminal of the power supply circuit of the host according to the first embodiment when the number of conductive switches is increased as compared to the case of FIGS. 6A and 6B.

FIG. 6E shows an example of a waveform of the control signal supplied from the DC/DC controller circuit 66 to the gate terminal of the MOS transistor 70, and FIG. 6F shows an example of a voltage waveform of the power-supply voltage output terminal 82 of the power supply circuit 22, when the number of conductive switches 114 increases as compared to the case of FIGS. 6A and 6B. As the synthesis capacitance of the capacitors 80, 110, and 120 connected to the power-supply voltage output terminal 82 decreases, the time for which the voltage of the power-supply voltage output terminal 82 is the threshold value or less becomes longer. Thus, in the case of FIGS. 6E and 6F, the switching frequency of the PFM method is lower than that in the case of FIGS. 6A and 6B.

Therefore, when buzzing noise occurs, by changing the number of conductive switches 114, even when the natural frequencies R1, R2, and R3 are in the audible frequency band of 20 Hz to 20 kHz as illustrated in FIG. 5B, the fluctuation frequency f2 of the voltage of the power-supply voltage line 109 can be adjusted so as not to match any of the natural frequencies R1, R2, and R3, and buzzing noise can be prevented.

Figure 7:
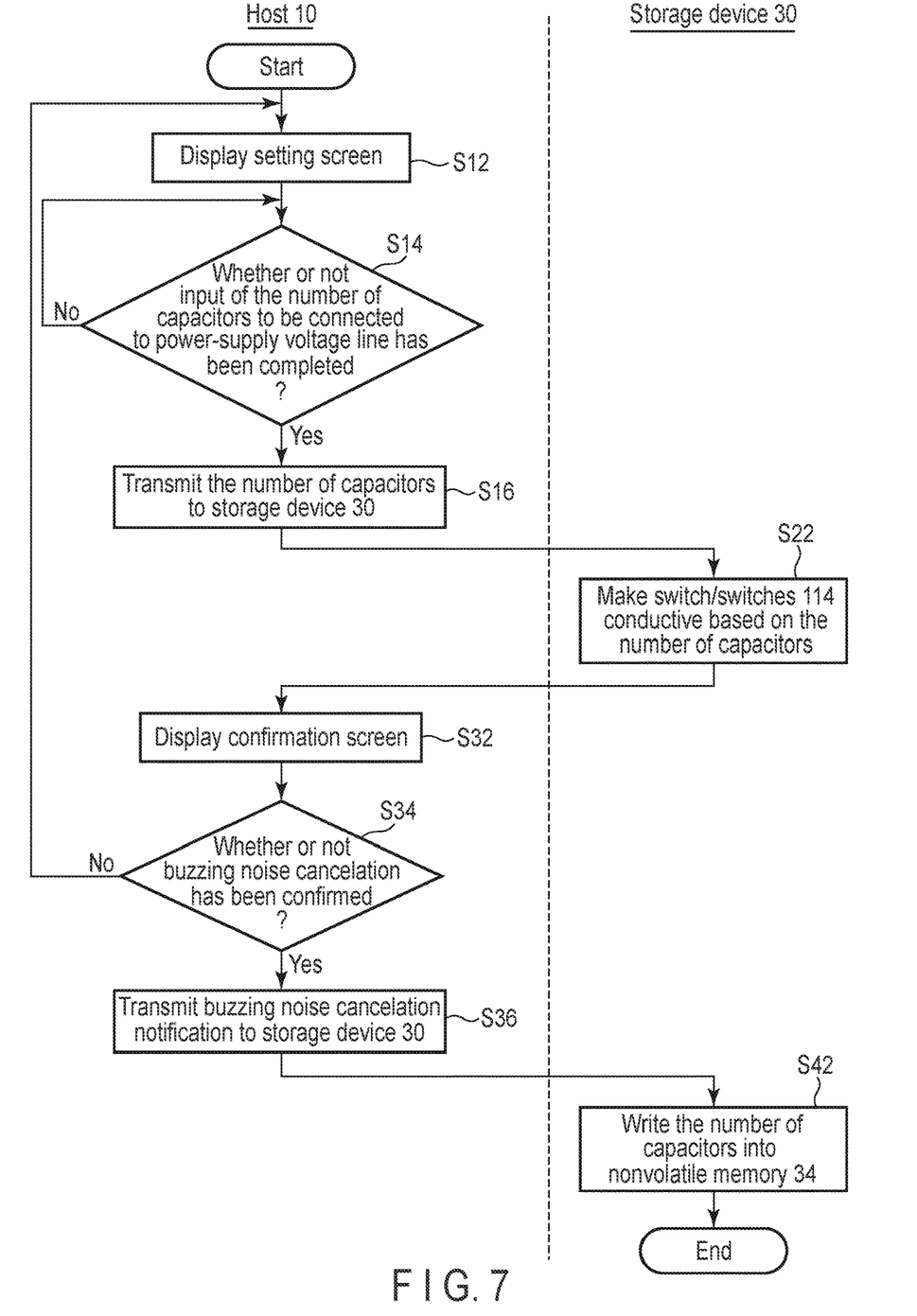
FIG. 7 is a diagram illustrating an example of a flow of processing for cancelling buzzing noise according to the first embodiment.

A user of the storage device 30 activates the buzzing noise cancelling program of the host 10 when buzzing noise occurs and the buzzing noise is annoying. FIG. 7 shows an example of a flow of processing for cancelling buzzing noise. The initial state of the plurality of switches 114 is freely selectable, but as an example, in the initial state (factory shipment state) of the storage device 30, the switching controller 108 may be set so that all of the plurality of switches 114 are non-conductive. Alternatively, as described with reference to FIGS. 6A and 6B, in the initial state of the storage device 30, the switching controller 108 may be set so that half of the plurality of switches 114 are conductive and half of the plurality of switches 114 are non-conductive.

When the buzzing noise cancelling program is activated (START), the host 10 displays a setting screen on the display device 18 (S12). An example of the setting screen may include the text "Capacitance of power-supply voltage line is changed to cancel buzzing noise. Please specify the number of capacitors to connect to power-supply voltage line", an input box to specify the number of capacitors, and an OK button. When the setting screen is displayed, a user inputs the number (positive integer) of capacitors to be connected or the number (negative integer) of capacitors to be disconnected to the input box, and presses the OK button.

After displaying the setting screen, the host 10 determines whether the OK button has been pressed after the number of capacitors is input to the input box to determine whether the input of the number of capacitors to be connected to the power-supply voltage line 109 is completed (S14).

When the input of the number of capacitors is not completed (NO in S14), the host 10 repeats the determination (S14) until the input is completed.

When the input of the number of capacitors is completed (YES in S14), the host 10 transmits the input number of capacitors to the storage device 30 (S16).

The storage device 30 causes the switching controller 108 to make the number of switches 114 as many as the number of capacitors transmitted from the host 10 conductive (S22). If the number of capacitors is a negative integer, the switching controller 108 makes the number of switches 114 as many as the number of capacitors transmitted from the host 10 non-conductive (S22). The received number of capacitors is stored in a temporary storage area of the volatile memory 36.

As a result, the number of capacitors 112 connected to the power-supply voltage line 109 is increased or decreased, and as illustrated in FIGS. 6A to 6F, the fluctuation frequency of the voltage at the power-supply voltage output terminal 82 of the DC/DC converter 62 of the power supply circuit 22 of the host 10 is changed. Therefore, the fluctuation frequency of the voltage applied to the capacitors 110 and 112 in the power supply circuit 40 of the storage device 30 can be deviated from any natural frequency of the storage device 30. As a result, there is a possibility that buzzing noise will be cancelled.

After transmitting the number of capacitors to the storage device 30, the host 10 displays a confirmation screen on the display device 18 (S32). An example of the confirmation screen includes the text "buzzing noise has been cancelled?", "YES button", and "NO button". When the confirmation screen is displayed, if buzzing noise has been cancelled, a user presses the "YES button", and if buzzing noise has not been cancelled, the user presses the "NO button".

After displaying the confirmation screen, the host 10 determines whether the "YES button" or the "NO button" has been pressed to determine whether buzzing noise cancelation has been confirmed (S34).

When the "NO button" is pressed (S34 NO), the host 10 executes display processing of the setting screen (S12). A user can continue to input the number of capacitors to be connected to the power-supply voltage line 109.

When the "YES button" is pressed (YES in S34), the host 10 transmits a buzzing noise cancelation notification to the storage device 30 (S36).

When the CPU 42 of the storage device 30 receives the buzzing noise cancelation notification transmitted from the host 10, the CPU 42 writes the number of capacitors stored in the temporary storage area of the volatile memory 36 into the nonvolatile memory 34 (S42). After this, the processing ends (END). As a result, the number of capacitors set by the buzzing noise cancelling program of the host 10 is stored in the storage device 30 even if the storage device 30 is shut down.

Figure 8:
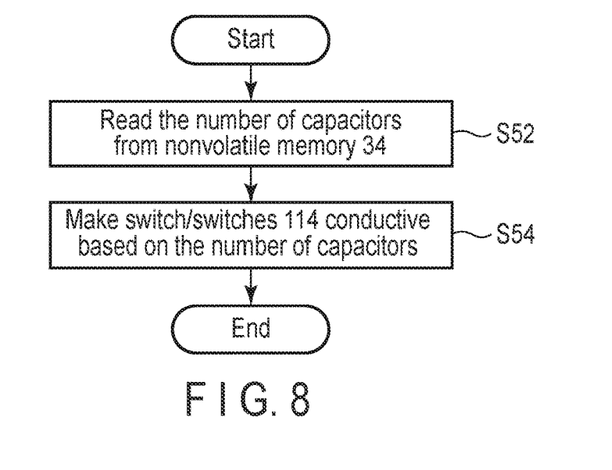
FIG. 8 is a diagram illustrating an example of a flow of initial setting processing when a storage device is powered on according to the first embodiment.

FIG. 8 shows an example of a flow of initial setting processing when the storage device 30 is powered on. When the storage device 30 is powered on (START), the CPU 42 reads the number of capacitors from the nonvolatile memory 34 (S52). Then, the CPU 42 causes the switching controller 108 to make the number of switches 114 as many as the number of the read capacitors conductive (S54). As a result, the "number of switches 114 that does not cause buzzing noise" obtained by executing the buzzing noise cancelling program can be made conductive. Therefore, it is not necessary to execute the buzzing noise cancelling program every time the storage device 30 is powered on to determine the "number of switches 114 that does not cause buzzing noise". After this, the processing ends (END).

As described above, according to the first embodiment, the plurality of minute multilayer ceramic capacitors 112 are connected in parallel via the switches 114 to the power-supply voltage line 109 of the power supply circuit 40 connected to the power-supply voltage output terminal 82 of the power supply circuit 22 of the host 10. By controlling the number of conductive switches among the plurality of switches 114, the fluctuation frequency of the output voltage of the power supply circuit 22 driven by the PFM method can be changed. Therefore, it is possible to prevent the fluctuation frequency of the voltage applied to the multilayer ceramic capacitors 112 from being matched with the natural frequency or frequencies of the storage device 30 without changing the host 10 by only slightly changing the storage device 30, so that buzzing noise can be prevented.

Figure 9:
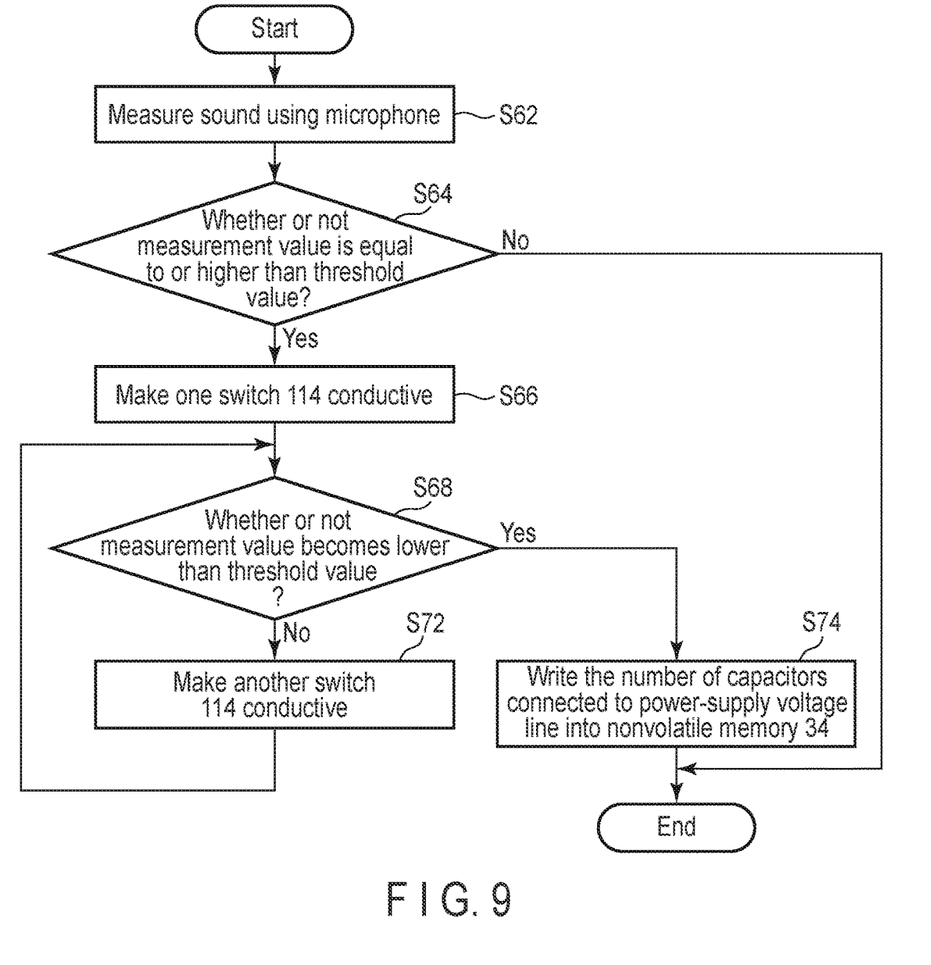
FIG. 9 is a diagram illustrating an example of a flow of processing for cancelling buzzing noise according to a second embodiment.

In the first embodiment, it is necessary for a user to input the number of capacitors to be connected to the power-supply voltage line 109 on the setting screen. The second embodiment in which the number of capacitors to be connected to the power-supply voltage line 109 can be automatically set will be described. Since the configuration of the second embodiment is almost the same as the configuration of the first embodiment, the illustration is omitted. The second embodiment is different from the first embodiment in that the host 10 does not store the buzzing noise cancelling program, the storage device 30 further includes a microphone, and the nonvolatile memory 34 stores a second buzzing noise cancelling program. The second buzzing noise cancelling program executes processing as illustrated in FIG. 9.

After shipment, when the storage device 30 is first powered on, the CPU 42 of the storage device 30 executes the second buzzing noise cancelling program. However, the timing is not limited to this timing, and the CPU 42 may execute the second buzzing noise cancelling program when there is an instruction from a user. When the second buzzing noise cancelling program is executed (START), the CPU 42 measures sound using the microphone (S62). The CPU 42 determines whether a measurement value of the sound is equal to or higher than a threshold value (S64).

When the measurement value of the sound is not equal to or higher than the threshold value (NO in S64), the processing ends (END).

When the measurement value of the sound is higher than the threshold value (YES in S64), the CPU 42 causes the switching controller 108 to make one switch 114 conductive (S66). The number of conductive switches among the plurality of switches 114, that is, the number of capacitors connected to the power-supply voltage line 109 is stored in a temporary storage area of the volatile memory 36. Then, the CPU 42 determines whether the measurement value of the sound becomes lower than the threshold value (S68).

When the measurement value of the sound does not become lower than the threshold value (NO in S68), the CPU 42 causes the switching controller 108 to further make another switch 114 conductive (S72). The number of conductive switches 114 is written into the temporary storage area of the volatile memory 36. Then, the CPU 42 determines whether the measurement value of the sound becomes lower than the threshold value (S68).

When the measurement value of the sound becomes lower than the threshold value (YES in S68), the CPU 42 writes the number of capacitors connected to the power-supply voltage line 109 stored in the temporary storage area of the volatile memory 36 into the nonvolatile memory 34 (S74). After this, the processing ends (END).

If the measurement value does not become lower than the threshold value even when S72 is executed and all the plurality of switches 114 are made conductive, a switch 114 may be made non-conductive in S72.

After the shipment, when the storage device 30 is powered on for the second time and thereafter, the initialization processing illustrated in FIG. 8 is performed as in the first embodiment, the number of capacitors written into the nonvolatile memory 34 in S74 is read from the nonvolatile memory 34, and the number of switches 114 as many as the number of the read capacitors are made conductive.

Note that in the example of FIG. 9, the storage device 30 executes the processing for cancelling buzzing noise and the host 10 does nothing, but the host 10 may mainly perform the processing. For example, the host 10 may cause the storage device 30 to measure sound with the microphone and transmit the measurement result to the host 10. The host 10 may determine how many switches 114 is to be made conductive based on the measurement result, and may indicate the number of switches 114 to be made conductive to the storage device 30. The switching controller 108 of the storage device 30 makes the number of switches 114, which is indicated by the host 10, conductive, and connects the number of capacitors 112, which is indicated, to the power-supply voltage line 109.

As described above, according to the second embodiment, when the storage device 30 detects occurrence of buzzing noise, the switching controller 108 changes the number of the switches 114 that are conductive to change the number of capacitors 112 connected to the power-supply voltage line 109 until the occurrence of buzzing noise is no longer detected, so that the synthesis capacitance of the power-supply voltage line is automatically changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a power-supply voltage input terminal;
   a first capacitor having a fixed capacitance;
   a second capacitor having a variable capacitance, the first capacitor and the second capacitor being connected in parallel to the power-supply voltage input terminal;
   a sensor configured to measure sound; and
   a controller configured to change the capacitance of the second capacitor when a level of the sound measured by the sensor is higher than a threshold value.

2. The storage device of claim 1, wherein
   the first capacitor comprises a multilayer ceramic capacitor; and
   the second capacitor comprises a multilayer ceramic capacitor.

3. The storage device of claim 1, wherein
   the second capacitor comprises third capacitors and switches,
   the third capacitors respectively have fixed capacitances, and
   the switches are respectively connected between the third capacitors and the power-supply voltage input terminal.

4. The storage device of claim 3, further comprising a nonvolatile memory configured to store data indicating a number of switches which are conductive.

5. The storage device of claim 4, further comprising a nonvolatile memory configured to store data indicating a number of third capacitors connected to the power-supply voltage input terminal via at least one of the switches which are conductive.

6. The storage device of claim 3, further comprising:
   a transmission circuit configured to transmit an information to an external device, the information indicating that a level of the sound measured by the sensor is higher than a threshold value; and
   the controller being configured to change the capacitance of the second capacitor based on an instruction from the external device.

7. The storage device of claim 6, wherein the controller is configured to make at least one of the switches conductive based on the instruction from the external device.

8. The storage device of claim 1, wherein
   the power-supply voltage input terminal is configured to be connected to a voltage output terminal of an electronic device including a DC/DC converter of a pulse frequency modulation type;

the storage device further comprises a voltage conversion circuit configured to change a value of a voltage supplied to the power-supply voltage input terminal; and the first capacitor and the second capacitor are connected in parallel to a signal line connecting the voltage conversion circuit and the power-supply voltage input terminal.

9. The storage device of claim 1, wherein the capacitance of the second capacitor is set to a value such that a fluctuation frequency of a voltage applied to the second capacitor does not match a natural frequency of the storage device.

10. A method for a storage device, wherein the storage device comprises a power-supply voltage input terminal, a first capacitor having a fixed capacitance, a second capacitor having a variable capacitance, and a sensor configured to measure sound, the first capacitor and the second capacitor being connected in parallel to the power-supply voltage input terminal, the method comprising:

changing the capacitance of the second capacitor when a level of the sound measured by the sensor is higher than a threshold value.

11. The method of claim 10, wherein the second capacitor comprises third capacitors and switches;

the third capacitors respectively have fixed capacitances; and when the level of the sound measured by the sensor is higher than the threshold value, at least one of the switches is made conductive and at least one of the third capacitors is connected to the power-supply voltage input terminal.

12. The method of claim 11, wherein the storage device further comprises a nonvolatile memory configured to store, and data indicating a number of switches that are conductive is written into the nonvolatile memory.

13. A storage device comprising:

a power-supply voltage input terminal;

a first capacitor having a fixed capacitance; and a second capacitor having a variable capacitance, the first capacitor and the second capacitor being connected in parallel to the power-supply voltage input terminal, wherein:

the power-supply voltage input terminal is configured to be connected to a voltage output terminal of an electronic device including a DC/DC converter of a pulse frequency modulation type;

the storage device further comprises a voltage conversion circuit configured to change a value of a voltage supplied to the power-supply voltage input terminal; and the first capacitor and the second capacitor are connected in parallel to a signal line connecting the voltage conversion circuit and the power-supply voltage input terminal.

14. The storage device of claim 13, wherein the first capacitor comprises a multilayer ceramic capacitor; and the second capacitor comprises a multilayer ceramic capacitor.

15. The storage device of claim 13, wherein the second capacitor comprises third capacitors and switches, the third capacitors respectively have fixed capacitances, and the switches are respectively connected between the third capacitors and the power-supply voltage input terminal.

16. The storage device of claim 15, further comprising a nonvolatile memory configured to store data indicating a number of switches which are conductive.

17. The storage device of claim 16, further comprising a nonvolatile memory configured to store data indicating a number of third capacitors connected to the power-supply voltage input terminal via at least one of the switches which are conductive.

18. The storage device of claim 15, further comprising:

a sensor configured to measure sound;

a transmission circuit configured to transmit an information to an external device, the information indicating that a level of the sound measured by the sensor is higher than a threshold value; and a controller configured to change the capacitance of the second capacitor based on an instruction from the external device.

19. The storage device of claim 18, wherein the controller is configured to make at least one of the switches conductive based on the instruction from the external device.

20. The storage device of claim 13, wherein the capacitance of the second capacitor is set to a value such that a fluctuation frequency of a voltage applied to the second capacitor does not match a natural frequency of the storage device.

* * * * *